(12) United States Patent
Inoue et al.

(10) Patent No.: US 7,088,646 B1
(45) Date of Patent: Aug. 8, 2006

(54) TRACK SEARCH CONTROL CIRCUIT AND OPTICAL DISC DRIVE

(75) Inventors: Takashi Inoue, Yokohama (JP); Yasuhiro Hayashi, Yokohama (JP); Satoru Maeda, Kodama-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1210 days.

(21) Appl. No.: 09/655,352

(22) Filed: Sep. 8, 2000

(30) Foreign Application Priority Data

Sep. 9, 1999  (JP) .................................. 11-256209

(51) Int. Cl.
  *G11B 7/00* (2006.01)
  *G11B 19/22* (2006.01)
(52) U.S. Cl. ................................ 369/44.28; 369/44.38
(58) Field of Classification Search ............. 369/44.28, 369/47.38; G11B 7/00, 19/22
  See application file for complete search history.

(56) References Cited

U.S. PATENT DOCUMENTS

| | | | |
|---|---|---|---|
| 4,955,010 A | | 9/1990 | Nabeshima et al. |
| 5,339,299 A | | 8/1994 | Kagami et al. |
| 5,371,726 A | * | 12/1994 | Suzuki ................ 369/44.28 |
| 5,661,705 A | | 8/1997 | Kunikata et al. |
| 5,671,200 A | * | 9/1997 | Yamaguchi et al. ..... 369/44.28 |

FOREIGN PATENT DOCUMENTS

| | | |
|---|---|---|
| JP | 63-317992 | 12/1988 |
| JP | 2-143927 | 6/1990 |

* cited by examiner

*Primary Examiner*—A M Psitos
(74) *Attorney, Agent, or Firm*—Oblon, Spivak, McClelland, Maier & Neustadt, P.C.

(57) ABSTRACT

Disclosed is a track-search control circuit for performing track-search of an optical disc stably even at the time of multi-speed reproduction of the optical disc. The track search control circuit comprises a circuit for detecting the light beam having traversed the track when the light beam moves in the radial direction of the optical disc and generating a normal direction on-track signal FVACLR at the time of being on the track and a normal direction off-track signal FVBCLR at the time of being off the track, a first measurement circuit that starts time measurement at the time of generating the normal direction on-track signal, a second measurement circuit that starts time measurement at the time of generating the normal direction off-track signal, circuits which detect the error between a moving velocity of the optical beam in the radial direction of the optical disc and a target velocity based on a measurement output by the first measurement circuit and a measurement output by the second measurement circuit, and a correction circuit for correcting the moving velocity of the optical beam in the radial direction based on the detected error signal.

23 Claims, 7 Drawing Sheets

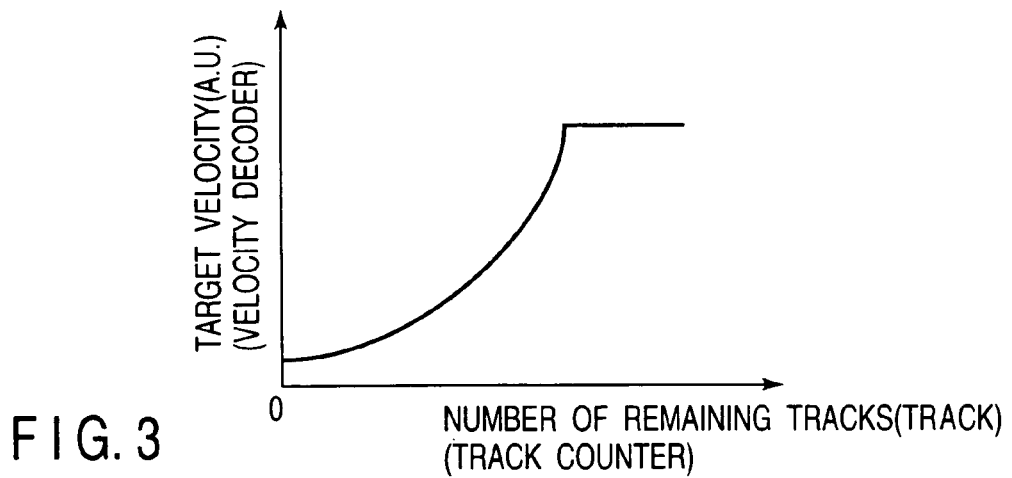
F I G. 3
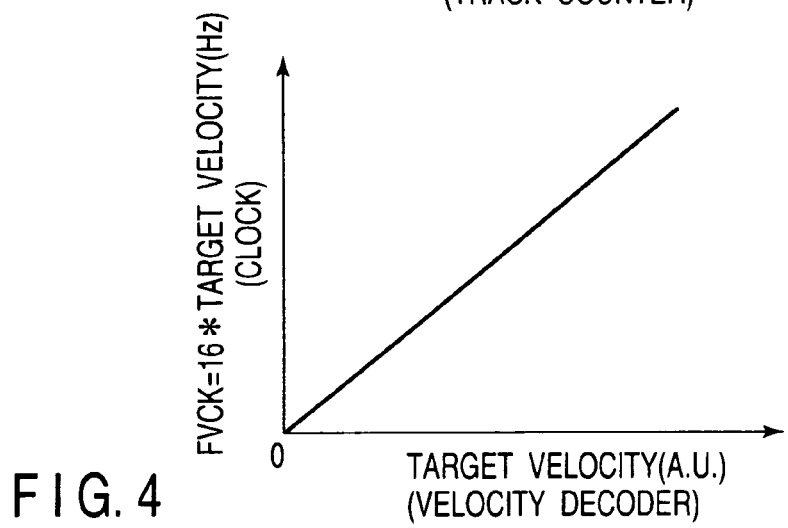
F I G. 4
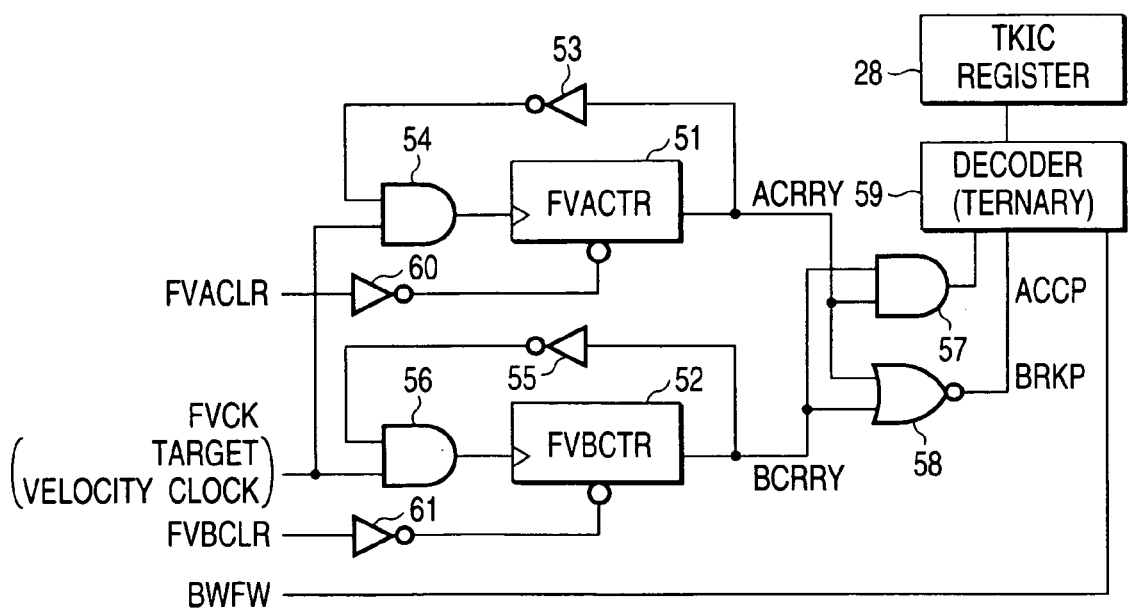
F I G. 5

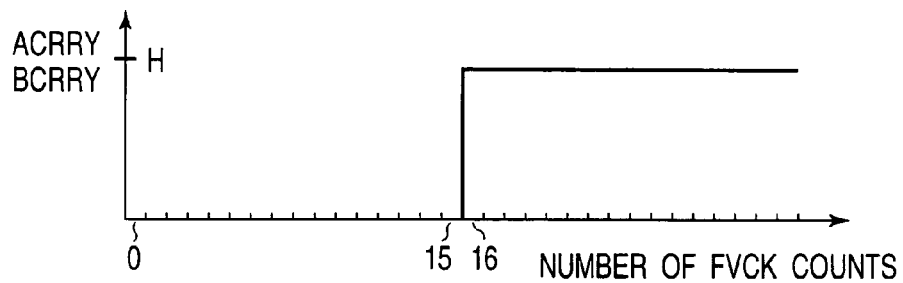
FIG. 6
| BWFW | ACCP | BRKP | TKIC |
|---|---|---|---|
| L | L | L | 0 |
|   | L | H | -MAX |
|   | H | L | +MAX |
| H | L | L | 0 |
|   | L | H | +MAX |
|   | H | L | -MAX |
FIG. 7
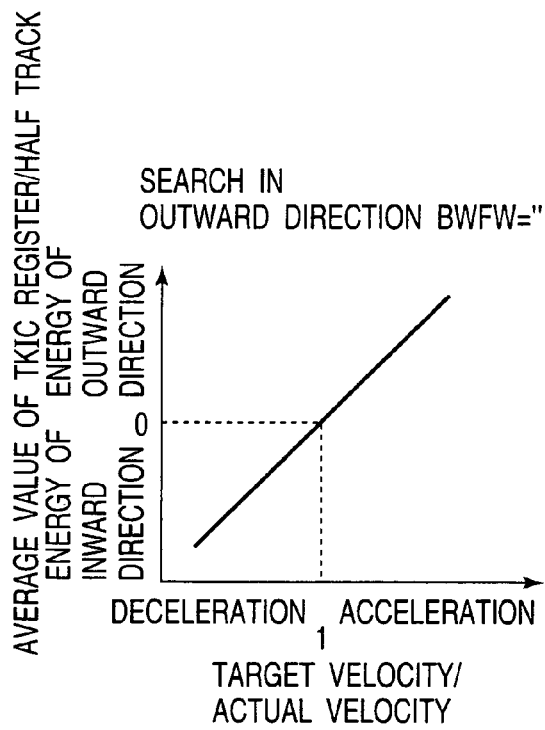
FIG. 9
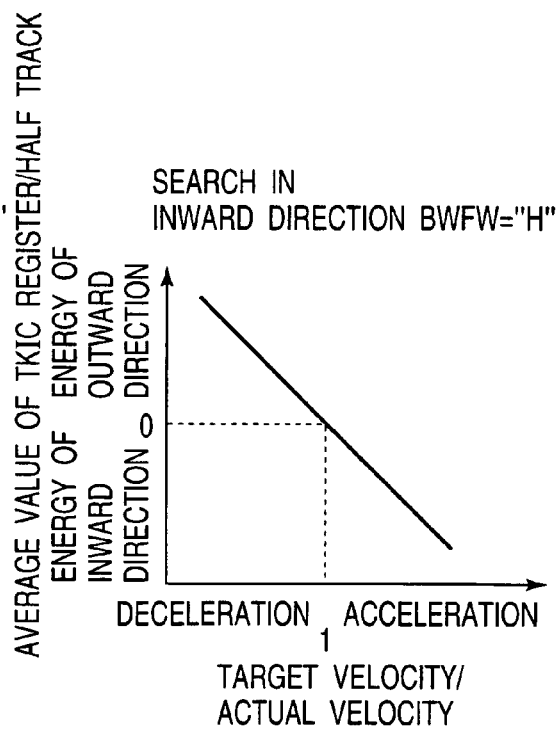
FIG. 10

TRACK SEARCH CONTROL CIRCUIT AND OPTICAL DISC DRIVE

CROSS-REFERENCE TO RELATED APPLICATIONS

This application is based upon and claims the benefit of priority from the prior Japanese Patent Application No. 11-256209, filed Sep. 9, 1999, the entire contents of which are incorporated herein by reference.

BACKGROUND OF THE INVENTION

The present invention relates to a track search control circuit for controlling track search of an optical disc and an optical disc drive equipped with a track search control device with the use of the track search control circuit, which are used, for example, for optical disc reproducing apparatuses such as a CD (Compact Disc) ROM drive for a computer system, a DVD (Digital Versatile Disc) drive, etc. and for optical disc recording/reproducing apparatuses for a CD-R, a CD-RW, a DVD-RAM, etc.

Conventionally, in optical disc systems for the DVD, the CD, etc., when the track search of the optical disc is performed, track traversing direction/frequency of a laser beam spot are detected using amplitude information of a tracking error signal and a readout signal at a time when the laser beam spot traverses the track, and the velocity control of the track search is performed.

That is, when the track search is performed, the track search control circuit is given the track search direction BWFW and the necessary number of tracks to be searched by a system controller, and generates track traversing information of the laser beam spot from a tracking error signal TE and a readout ripple signal RFRP. Then, acceleration/deceleration energy necessary for the track search is calculated from the track traversing information, the track search direction, and the number of tracks to be searched, and a signal indicative of the energy is added to an input of a tracking servo equalizer.

Now, along with the increase in a disc angular velocity in reproducing the optical disc in connection with the competition for reproduction speed of optical disc systems, the necessity of performing the track search under a condition of a large angular velocity of the disc has been arisen. However, in the case where the disc angular velocity is large, the variation of eccentric acceleration of the disc is large, and hence it is likely to be difficult to control the track search velocity effectively in the conventional track search method.

Hereafter, regarding this respect, a configuration of a conventional velocity error detection circuit for the track search control circuit will be described with reference to FIG. 11.

In the velocity error detection circuit of FIG. 11, a velocity error detection counter (FVCTR) 81 measures a semi-track interval. The velocity error detection counter FVCTR 81 is a 5-bit counter, whose count is incremented by a target velocity clock FVCK. Therefore, the target velocity clock counter (FVCTR) 81 can count thirty-two clocks (FVCKS) and when the counter reaches the full-count, a full count detection signal FULL-DET becomes logic "H". Further, when the velocity error detection counter (FVCTR) 81 counts the full count, a gate 83 for the target velocity clock FVCK is turned off using an inverted signal of the full count detection signal FULL-DET by the inverter circuit 82 in order that after the full count the full count value does not return to zero by the next target velocity clock FVCK.

On the other hand, a normal direction on-track/off-track signal FVCLR is a pulse generated at the normal direction on-tracking/off-tracking time, which clears the FVCTR 81. It should be noted that the "normal direction" means a case where a direction in which the lens of the pick-up mechanism is moved with regard to the track is the same as a track search direction given by a system controller.

A data latch signal FVLP is a pulse generated just before the generation of the normal direction on-track/off-track signal FVCLR. The data latch signal FVLP latches (the count value of the FVCTR−15)×(+1) or (the count value of the FVCTR−15)×(−1) in the TKIC (track search velocity control) register 85. Specifically, when the track search is to be performed in the outward direction, the BWFW signal from the system controller is goes to a logical low level, and in this time, (the count value of the FVCTR−15)×(+1) is latched by the TKIC register 85. On the other hand, when the track search is to be performed in the inward direction, the BWFW signal from the system controller goes to a logical high level, and in this time, (the count value of the FVCTR−15)×(−1) is latched by the TKIC register 85.

data including the count value (velocity measurement data) of the FVCTR 81 and the track search direction BWFW given by the system controller into a TKIC (track search velocity control) register 85. These normal direction on-track/off-track signal FVCLR and data latch signal FVLP are generated using the tracking error signal TE and the readout ripple signal RFRP.

Therefore, the velocity measurement result by the FVCTR 81 that counts up the target velocity clock FVCK is loaded into the TKIC register 85 at the data latch signal FVLP generated just before the generation of the track pulse, and is cleared by an inverted signal of the normal direction on-track/off-track signal FVCLR by an inverter circuit 84. In this case, a velocity measuring period of the FVCTR 81 is a half-track period, and acceleration/deceleration data stored in the TKIC register 85 is outputted in a half-track period next to the velocity measuring half-track period.

FIG. 12 is a characteristic diagram showing the relation between the track search velocity error and the number of the FVCK counts of the velocity error detection counter (FVCTR) 81 of FIG. 11.

FIG. 13 is a characteristic diagram showing the relationship between the FVCTR value detected as the velocity error and the value stored in the TKIC register 85 in the outward direction search, i.e., BWFW="L".

FIG. 14 is a characteristic diagram showing the relationship between the FVCTR value detected as the velocity error and the value stored in the TKIC register 85 in the inward direction search, i.e., BWFW="H".

FIG. 15 is a waveform chart showing output timing for a velocity error detection result in the velocity error detection circuit of FIG. 11 in a case where a track search in the outward direction is taken as an example.

In FIGS. 11 and 15, the target velocity clock FVCK is a clock having a frequency sixteen times that of the actual target velocity (half-track traversing target frequency). Accordingly, if the FVCTR 81 counted sixteen clocks until the velocity measurement result of the FVCTR 81 is latched in the TKIC register 85 at the data latch signal FVLP, it is the case where the actual velocity is equal to the target velocity (i.e. the velocity error being zero), the value zero ("0") is stored in the TKIC register 85.

Moreover, if the FVCTR 81 counted less than sixteen clocks until the velocity measurement result of the FVCTR 81 is latched in the TKIC register 85 at the data latch signal FVLP, it is the case where the actual velocity is higher than the target velocity, and a negative value in the outward direction search or a positive value in the inward direction search is stored in the TKIC register 85.

On the contrary, if the FVCTR 81 counted more than sixteen clocks until the velocity measurement result of the FVCTR 81 is latched in the TKIC register 85 at the data latch signal FVLP, it is the case where the actual velocity lower than the target velocity, and a positive value in the outward direction search or a negative value in the inward direction search is stored in the TKIC register 85.

In this way, error data between the target velocity and the actual track traversing velocity is modified by the track search direction signal BWFW and stored in the TKIC register 85, which becomes an input of addition of the tracking servo equalizer to effect the addition of a signal indicative of acceleration/deceleration energy in a tracking direction.

The velocity control method for the track search mentioned above referring to FIGS. 11 to 15 has an advantage that the track search velocity can be controlled accurately based on the measured velocity error (in multiple values). However, as will be mentioned below, it is difficult to perform the track search in the optical disc system for the DVD, the CD, etc. stably when the disc is reproduced at a multi-speed, because the timing of outputting the velocity measurement result stored in the TKIC register 85 is always in a next half-track period next to the period (half-track) when the velocity measurement was performed and because there may exist the eccentricity of the axis of rotation of the optical disc.

That is, generally in the case of a removable disc, when the disc is manufactured, the center of the disc made in a donut-shape is not necessarily in the center of a track formed in a spiral manner from which the signal is read. Moreover, the center of a track formed in a spiral manner is not necessarily in the axis of a disc motor, which results from improper placement of the disc when the disc is loaded (clamped). Furthermore, in manufacturing a disc drive, it is probable that the rotor axis of the disc motor for rotating the disc is not in the actual axis of rotation. Moreover, the rotor axis of the disc motor may have inclination to the actual axis of rotation.

The effect of such eccentricity of the disc rotation on the track search will be considered. When the track search is performed in an ideal condition without the eccentricity and if an objective lens housed in the pickup is moved at a constant velocity toward the inward direction/outward direction of the disc with respect to a frame fixing the mechanism, the relative velocity between the track and the objective lens becomes also constant. However, when the track search is performed under a condition with the existence of the eccentricity, if the objective lens is moved at a constant velocity with respect to the frame, the relative velocity between the track and the objective lens is modulated by the eccentric acceleration.

Therefore, in order to keep the relative velocity between the track and the objective lens constant or in a target velocity, it is necessary to alter the acceleration/deceleration energy that is given to a tracking coil (a drive coil of a pickup sending motor) in response to this change of the eccentric acceleration.

In this case, in the velocity control method as described above, the velocity measurement is performed for every half-track period by counting the target velocity clock FVCK and this count data is used as the track search velocity error data (acceleration/deceleration data). However, regarding the velocity measurement, the velocity measurement result for previous half-track period is used and the acceleration/deceleration data is outputted in a half-track period next to the velocity measuring half-track period, and hence this method may arise a problem.

The reason for this is that, since the variation of the eccentric acceleration is large in the multi-speed reproduction, the relative velocity between the track and the lens for the half-track period when the track search velocity is measured may differ largely from that for a half-track period when the acceleration/deceleration data is actually outputted, which results from the modulation due to the eccentricity.

That is, in an example shown in FIG. 15, at a time when the count value of the FVCTR 81 reaches C5, the track search control circuit is going to operate in such a way that almost maximum acceleration energy in the outward direction is made to be outputted, however in the next half-track period when the acceleration/deceleration data for outputting this acceleration energy is actually outputted, the track search velocity has already become approximately close to the target velocity.

The worst case is a case where the track search velocity is too high compared to the target velocity at the time of the detection of the track velocity, and the track search velocity, namely the relative velocity between the track and the objective lens, is controlled so as to become lower because of the erroneous measurement of the track search velocity resulted from the modulation due to the eccentricity in the next half-track period when the acceleration/deceleration data for causing the deceleration energy to output is actually outputted. In this case, although the track search velocity is low, the deceleration energy is to be further applied. However, since the acceleration/deceleration data is not renewed until the light beam traverses the track, there is likely to occur a situation where the deceleration energy term is kept on to be applied. In this case, the acceleration/deceleration control gets into an oscillation state and it may be difficult that the track search is stably performed.

BRIEF SUMMARY OF THE INVENTION

The present invention has been contrived in order to solve the above-mentioned problem, and its object is to provide a track search control circuit which can promptly reflect a detected result of the track search velocity at a multi-speed reproduction time on the acceleration/deceleration data, to thereby stably perform the track search operation as well as an optical disc drive equipped with a track search device including such a track search control circuit.

A track search control circuit according to a first aspect of the present invention comprises an optical pickup for emitting and moving a light beam in the radial direction of an optical disc to write information signal into the optical disc or read the information signal therefrom; a track traversing signal generation circuit for detecting, when the light beam emitted from the optical pickup moves in the radial direction of the optical disc, the light beam having traversed a track of the optical disc, and generating a normal direction on-track signal in an on-track period when the light beam traverses a zone of the track in a track search direction defined by a system controller and a normal direction off-track signal in an off-track period when the light beam traverses a zone between the tracks; a first time measurement circuit which starts time measurement at a time when the normal direction on-track signal is generated by the track traversing signal generation circuit; a second time measurement circuit which starts time measurement at a time when the normal direction off-track signal is generated by the track traversing signal generation circuit; a velocity error signal generation circuit for detecting an error between a relative moving velocity of the light beam of the optical disc to the track and a target velocity based on a measurement outputted by the first time measurement circuit and a measurement outputted by the second time measurement circuit to generate an error signal; and a correction circuit for correcting the moving velocity of the light beam in the radial direction based on the error signal generated by the velocity error signal generation circuit.

In a track search control circuit according to the first aspect of the present invention, the normal direction on-track signal and the normal direction off-track signal may be generated approximately at the time of zero-crossing of a tracking error signal indicating a relative positional displacement in the radial direction of the optical disc between the track and the light beam emitted from the optical pickup.

An optical disc drive according to a second aspect of the present invention comprises an optical pickup for emitting a light beam on a track of an optical disc, on which information is recorded, and receiving the reflected light from the track or the transmitted light therethrough while the optical disc is rotating, thereby extracting the information and converting the information to an electric signal; a signal processing circuit for generating a tracking error signal that indicates a relative positional displacement in the radial direction of the optical disc between the track and the light beam emitted from the optical pickup and a ripple signal that indicates amplitude information, from the electrical signal output of the optical pickup at a time when the light beam emitted from the optical pickup moves in the radial direction of the optical disc; tracking servo mechanism for controlling the light beam emitted from the optical pickup in response to the tracking error signal so that the light beam in the radial direction of the disc is positioned on the track; a track traversing signal generation circuit for detecting that the light beam emitted from the optical pickup has traversed the track based on the tracking error signal and the ripple signal, and generating a normal direction on-track signal in an on-track period when the light beam traverses a zone of the track and a normal direction off-track signal in an off-track period when the light beam traverses a zone between the tracks; a first time measurement circuit that starts time measurement at a time when the normal direction on-track signal is generated by the track traversing signal generation circuit; a second time measurement circuit that starts time measurement at a time when the normal direction off-track signal is generated by the track traversing signal generation circuit; a velocity error signal generation circuit for detecting an error between a moving velocity of the optical beam in the radial direction of the optical disc and a target velocity based on a measurement output of the first time measurement circuit and a measurement output of the second time measurement circuit to generate an error signal; and a tracking velocity correction circuit for correcting the moving velocity of the optical beam in the radial direction by applying the error signal output of the velocity error signal generation circuit to the tracking servo mechanism.

In an optical disc drive according to the second aspect of the present invention, the tracking velocity correction circuit may start to apply a signal indicative of an acceleration energy corresponding to the error signal to the tracking servo mechanism in a half-track period after when the velocity error signal generation circuit starts the error detection and a signal indicative of a deceleration energy corresponding to the error signal to the tracking servo mechanism when a succeeding half-track comes in the target velocity period after when the velocity error signal generation circuit starts the error detection. The track traversing signal generation circuit, the first time measurement circuit, the second time measurement circuit, the velocity error signal generation circuit, and the tracking velocity correction circuit may be formed on the same semiconductor chip in a form of an integrated circuit.

In an optical disc drive according to the second aspect of the present invention, the track traversing signal generation circuit may generate the normal direction on-track signal and the normal direction off-track signal approximately at the time of zero-crossing of the tracking error signal.

The track traversing signal generation circuit, the first time measurement circuit, the second time measurement circuit, the velocity error signal generation circuit, and the tracking velocity correction circuit may be formed on the same semiconductor chip in a form of an integrated circuit.

In an optical disc drive according to the second aspect of the present invention, the first time measurement circuit may comprise a first counter which is cleared by the normal direction on-track signal, counts clock signals having a constant frequency higher than that of the normal direction on-track signal, and goes into a hold status after generating a first flag output indicating that the moving velocity of the light beam after the generation of the normal direction on-track signal is lower than the target velocity; the second time measurement circuit may comprise a second counter which is cleared by the normal direction off-track signal, counts the clock signals, and goes into a hold status after having counted a specified number of clocks and subsequently generating a second flag output indicating that the moving velocity of the light beam after the generation of the normal direction off-track signal is lower than the target velocity; and the velocity error signal generation circuit, based on the first flag output and the second flag output, may generate an acceleration flag when the moving velocity of the light beam after the generation of the normal direction on-track signal and the moving velocity of the light beam after the generation of the normal direction off-track signal are both lower than the target velocity, and may generate a deceleration flag when the moving velocity of the light beam after the generation of the normal direction on-track signal and the moving velocity of the light beam after the generation of the normal direction off-track signal are both higher than the target velocity. The tracking velocity correction circuit may apply the signal indicative of the acceleration energy or deceleration energy of substantially a constant level to the tracking servo mechanism during both the acceleration flag and the deceleration flag are logically set up. The track traversing signal generation circuit, the first time measurement circuit, the second time measurement circuit, the velocity error signal generation circuit, and the tracking velocity correction circuit may be formed on the same semiconductor chip in a form of an integrated circuit.

In an optical disc drive according to the second aspect of the present invention, the track traversing signal generation circuit, the first time measurement circuit, the second time measurement circuit, the velocity error signal generation circuit, and the tracking velocity correction circuit may be formed on the same semiconductor chip in a form of an integrated circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a characteristic diagram showing the relation between the number of remaining tracks in a velocity decoder of the FIG. 2 and the calculated results of the track search target velocity.

FIG. 4 is a characteristic diagram showing a transfer characteristic from the target velocity data to the actual target velocity clock in the target velocity clock generation circuit of FIG. 2.

FIG. 5 is a logical circuit chart showing one example of the velocity error detection circuit of FIG. 2.

FIG. 6 is a characteristic diagram showing the relation between the number of FVCK counts of the velocity error detection circuit of FIG. 5 and the velocity error detection signals ACRRY and BCRRY.

FIG. 7 is a characteristic diagram of a decoder of the velocity error detection circuit of FIG. 5.

FIG. 9 is a characteristic diagram showing the relation between the velocity error of the velocity error detection circuit of FIG. 5 and an average value of the TKIC register for each half-track, in the case of the outward direction search (BWFW="L").

FIG. 10 is a characteristic diagram showing the relation between the velocity error of the velocity error detection circuit of FIG. 5 and an average value of the TKIC register for each half-track, in the case of the inward direction search (BWFW="H").

DETAILED DESCRIPTION OF THE INVENTION

Figure 1:
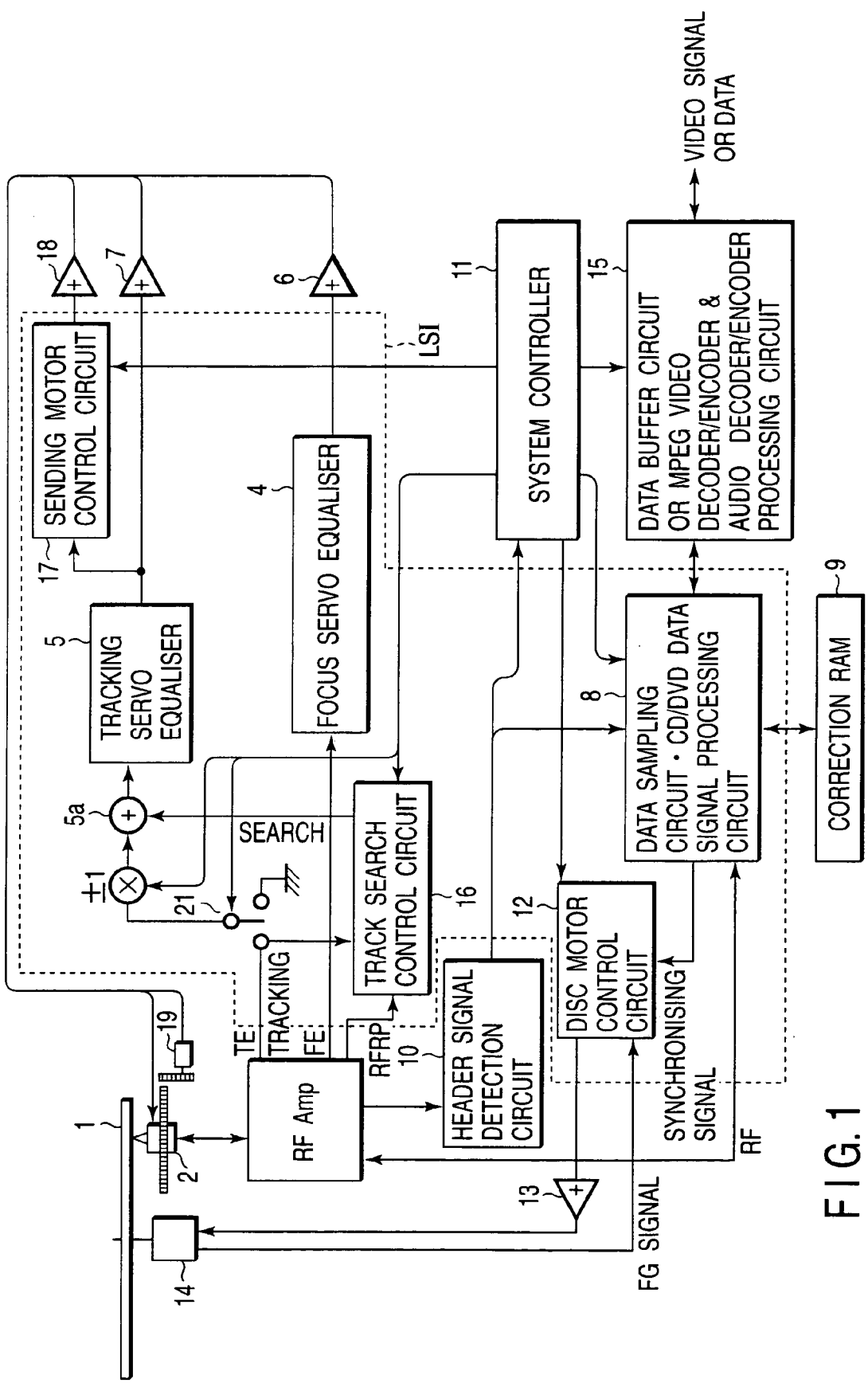
FIG. 1 is a block diagram showing one example of a DVD system according to an embodiment of the present invention.

Hereafter, referring to the drawings, an embodiment of the present invention will be described in detail.

FIG. 1 shows the block diagram of the DVD system according to an embodiment of the present invention.

An optical disc 1 serves as a storage medium, and is rotated by a disc motor 14.

An optical pickup 2 acts not only as signal writing means for recording the information data on the optical disc 1 in the form of digital data and but also as signal extracting means for reading the information data recorded in the optical disc 1. The optical pickup 2 emits a laser beam on the track of the optical disc 1. The track on the optical disc 1 is irradiated with the laser beam so that information data is recorded thereon. The optical pickup 2 detects a change of the radiant flux of the returning laser beam reflected by the track on the optical disc 1 to read the information data and outputs the information data as an electric signal.

The RF amplifier 3 extracts from an output signal of the optical pickup 2 a focusing error signal FE, the tracking error signal TE that indicates the positional displacement between the track and the laser beam, a readout signal RF, and the readout ripple signal RFRP.

A focus control loop comprises the RF amplifier 3, a focus servo equalizer 4, a focus actuator driver 6, and a focus actuator of the optical pickup 2.

The focus servo equalizer 4 is for receiving the focusing error signal FE and performing gain compensation and phase compensation to secure open loop gain and phase margin both necessary for the focus servo, and the focus actuator of the optical pickup 2 is driven in accordance with the output signal of the focus servo equalized 4 through the focus actuator driver 6.

By means of a feedback loop of the focus control so formed, the laser beam emitted from the pickup 2 is controlled so as to focus on the optical disc 1.

A tracking control loop comprises the RF amplifier 3, a tracking servo equalizer 5, a tracking actuator driver 7, and a tracking actuator of the optical pickup 2.

The tracking servo equalizer 5 is a circuit for receiving the tracking error signal TE and performing gain compensation and phase compensation to secure open loop gain and phase margin both necessary for the tracking servo, and the tracking actuator of the optical pickup 2 is driven in accordance with the output signal of the tracking servo equalizer 5 through the tracking actuator driver 7.

By means of a feedback loop of the tracking control so formed, the laser beam emitted from the pickup 2 is controlled so as to be positioned on the track on the optical disc 1.

In order to perform recording/reproduction on the whole area of the optical disc 1, from the innermost to the outermost in the radial direction, it is necessary to move the optical pickup 2 in the radial direction of the optical disc 1. A motor and a sliding actuator are used as a mechanism for moving the optical pickup 2, and a sending motor control circuit 17 and a sliding actuator driver 18 are used to control the mechanism. The sending motor control circuit 17 drives the sliding actuator through the sliding actuator driver 18 and the sending motor 19 based on the output signal of the tracking servo equalizer 5 and control input signal from the system controller 11.

A data sampling circuit-CD/DVD data signal processing circuit 8 is for receiving the readout signal RF, binarizing the signal RF, extracting a bit clock therefrom, extracting a synchronizing signal therefrom, and subsequently decoding the binarized signal RF, and making a correction using correction RAM 9.

The header signal detection circuit 10, when reproducing the DVD-RAM, receives the readout signal RF, detects a header, and sends the detection result to the system controller 11, which uses the detection result for servo control at a header portion and information extraction in the header. Moreover, at a changing point of a land/groove, by inverting the polarity of the tracking servo loop by controlling a polarity inverter circuit 20 in response to a land/groove changing signal from the system controller 11, a change from the land to the groove or vice versa is accomplished.

A disc motor control circuit 12 receives the synchronizing signal extracted by the data sampling circuit-CD/DVD data signal processing circuit 8, and carries out CLV (constant linear velocity) control of the disc motor 14 through a disc motor driver 13. Moreover, at the time of CAV (constant angular velocity; i.e. constant rotation number) reproduction, the disc motor control circuit 12 receives a signal FG having a frequency proportional to the rotation number of the optical disc 1 that is generated by the disc motor driver 13 and the disc motor 14, and carries out CAV control of the disc motor 14 based on the signal FG.

A track search control circuit 16 receives a track search direction signal BWFW and a necessary number of tracks to be searched from the system controller 11 when performing the track search, and generates track traversing information of the laser beam spot from the tracking error signal TE and the readout ripple signal RFRP. Then, the track search control circuit 16 calculates the acceleration/deceleration energy necessary for the track search from the track traversing information, the track search direction, and the number of tracks to be searched, and subsequently applies a signal indicative of the acceleration/deceleration energy to an input of the tracking servo equalizer 5 through an acceleration/deceleration energy adder 5a acting as a track search velocity correction circuit. At this time, the tracking control loop used normally for the reproduction is made open by opening a switch 21.

The following circuits are formed on the same LSI chip: the focus servo equalizer 4; the tracking servo equalizer 5; the polarity inverter circuit 20; the acceleration/deceleration energy adder 5a; the data sampling circuit•CD/DVD data signal processing circuit 8; the disc motor control circuit 12; the track search control circuit 16; the sending motor control circuit 17; and the switch 21.

An operation concerning read/write of the optical disc in the DVD system will now be described briefly.

(1) The operation when information is read from the optical disc 1 is as follows.

A signal read from the optical disc 1 by the optical pickup 2 is inputted into the RF amplifier 3 and the RF amplifier 3 extracts therefrom a focusing error signal FE, the tracking error signal TE, a readout signal RF, and the readout ripple signal RFRP.

The focus error signal FE and tracking error signal TE are inputted into the focus servo equalizer 4 and the tracking servo equalizer 5, respectively, and compensated for the gain and phase, and inputted into the respective actuator drivers 6 and 7, which drive the focus actuator and the tracking actuator, respectively.

The readout signal RF is binary coded and undergoes the extraction of the bit clock and the extraction of the synchronizing signal, and subsequently is demodulated and undergoes a correction with the use of the correction RAM 9, by the data sampling circuit•CD/DVD data signal processing circuit 8.

At the time of the DVD-RAM reproduction, the readout signal RF is also sent to the header signal detection circuit 10 simultaneously, where the header is detected. The detection result is sent to the system controller 11 and is used for the servo control in the header portion and the information extraction in the header.

Moreover, at the changing point of the land/groove, a land/groove change signal from the system controller 11 is sent to a polarity inverter circuit 20 in the tracking servo loop. By inverting the polarity of a tracking servo loop with the polarity inverter circuit 20, the change from the land to the groove or vice versa is accomplished.

The synchronizing signal extracted in data sampling circuit•CD/DVD data signal processing circuit 8 is sent to the disc motor control circuit 12, and is used to carry out CLV control of the disc motor 14 through the disc motor driver 13. Moreover, when the CAV reproduction is performed, the disc motor 14 and the disc motor driver 13 generate the signal FG having a frequency in proportion to the rotation numbers of the optical disc 1, which is sent to the disc motor control circuit 12, and the disc motor 14 is controlled based on the signal FG.

In the case of the DVD movie, data that is corrected by the data extracting circuit-CD/DVD data signal processing circuit is sent to the data buffer circuit-MPEG video decoder/audio decoder processing circuit 15, and is converted into a video output signal or an audio output signal.

On the other hand, in the case of the DVD-ROM, data that is corrected by the data sampling circuit•CD/DVD data signal processing circuit 8 is sent to the data buffer circuit 15, and subsequently is sent to a host personal computer, etc.

The system controller 11 controls the control timing of each control circuit and the operation of the whole system. Moreover, header information previously written in the optical disc 1 is read by the header signal detection circuit 10 and the data sampling circuit-CD/DVD data signal processing circuit 8.

(2) The operation when information is written in the optical disc 1 is as follows.

When information to be written is image information, a video signal is sent to the data buffer circuit-MPEG video encoder and audio encoder processing circuit 15, and subsequently is added with ID data, a parity bit, etc. and undergoes ECC encoding and modulation in the CD/DVD data signal processing circuit 8.

When information to be written is data, writing data is sent to the buffer circuit 15, and subsequently is added with ID data, the parity bit, etc. and undergoes the ECC encoding and the modulation in the CD/DVD data signal processing circuit 8.

Moreover, a bit clock is generated from the disc information, and while synchronizing with the bit clock, the writing data after the modulation is sent to the RF amplifier 3, whose output is used to form pits on the disc 1 with the pickup 2.

Here, referring to FIG. 2, the track search control circuit 16 of FIG. 1 will be described in detail.

In the track search control circuit 16, the track pulse generation circuit 22 generates a track pulse necessary for the track search based on the tracking error signal TE, the readout ripple signal RFRP, and the track search direction BWFW.

The track counter 23 performs counting in such a way that the number of tracks to be jumped that is necessary for the track search and given by the system controller 11 is subtracted with the number of track pulses inputted by the track pulse generation circuit 22, and outputs a signal indicative of the number of the remaining tracks to the target track.

The velocity decoder 24 decodes the signal indicative of the number of the remaining tracks outputted by the track counter 23 and outputs a track search target velocity signal corresponding to the number of the remaining tracks. In this occasion, as shown in FIG. 3, the track search target velocity is controlled to a high velocity when the number of the remaining tracks is large, to a gradually reducing velocity as the pickup gets close to the target track, and lastly to such a velocity in which the tracking error signal falls into the tracking servo band width when the pickup is getting to the target track.

The target velocity clock generation circuit 25 converts the target velocity data given by the velocity decoder 24 into the target velocity clock FVCK while referring to an oscillation frequency of a crystal oscillator (X'tal) 26 as a time standard. This target velocity clock FVCK is a signal having a frequency 16 times that of the target velocity (track traversing frequency). FIG. 4 shows the conversion characteristic of this target velocity clock generation circuit 25.

By comparing the target velocity clock FVCK given by the target velocity clock generation circuit 25 and the track pulse inputted by the track pulse generation circuit 22, the velocity error detection circuit 27 performs velocity error detection in a later-described way. The detected error is modified by the track search direction signal BWFW and stored in the TKIC (tracking search velocity control) register 28 as acceleration/deceleration data in the tracking direction.

This acceleration/deceleration data stored in the TKIC register 28 is multiplied by a summing-up coefficient K and inputted into the acceleration/deceleration energy adder 5a for addition, which applies a signal indicative of the acceleration/deceleration energy in the tracking direction to the tracking servo equalizer 5.

Figure 2:
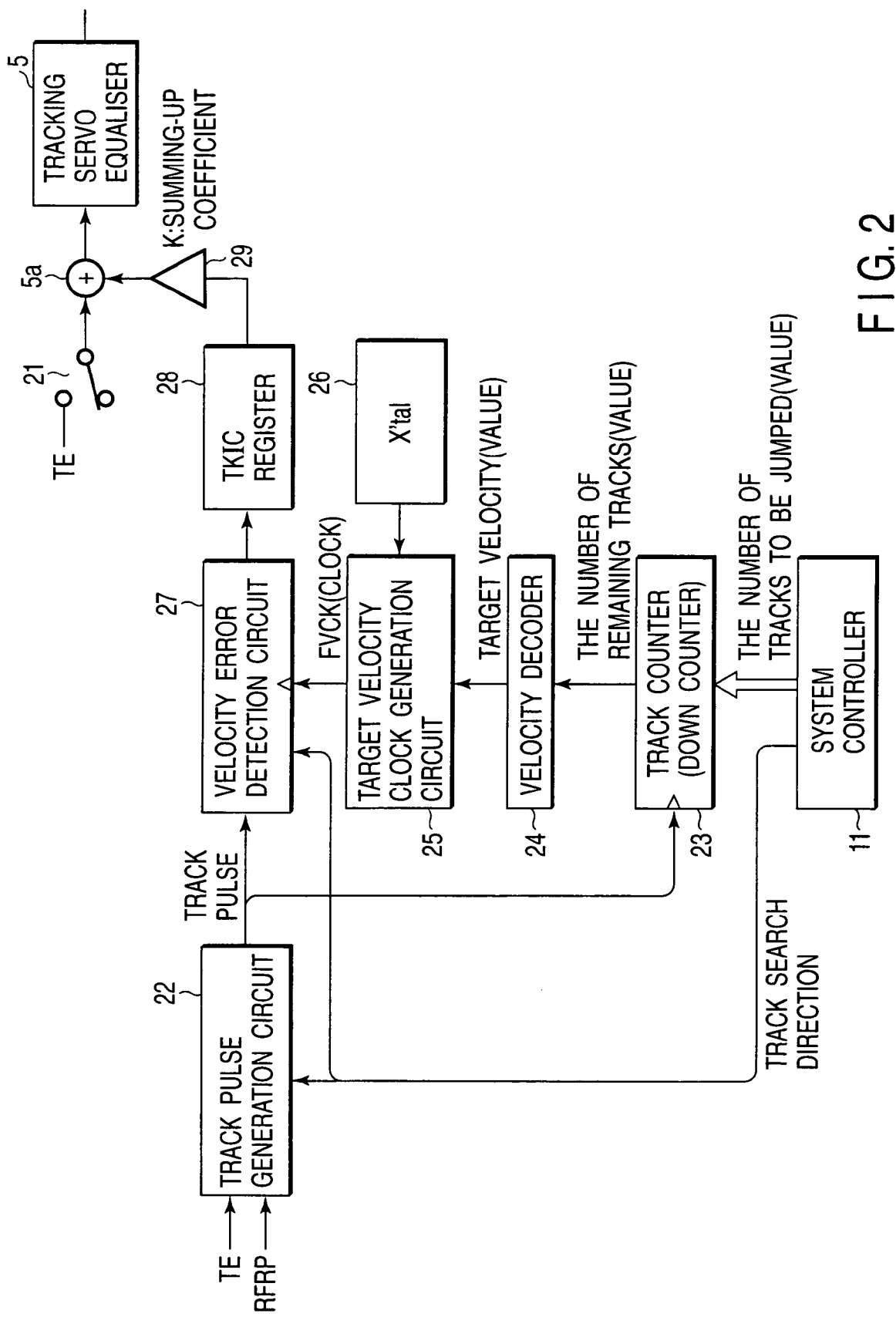
FIG. 2 is a view showing one example of the track search control circuit in the DVD system of FIG. 1.

FIG. 5 is the logical circuit chart showing one example of the velocity error detection circuit 27 of FIG. 2.

FIG. 6 is the characteristic diagram showing the relation between the number of FVCK counts and the velocity error detection signals ACRRY and BCRRY in the velocity error detection circuit of FIG. 5.

FIG. 7 is a characteristic diagram of a decoder of the velocity error detection circuit of FIG. 5.

Figure 8:
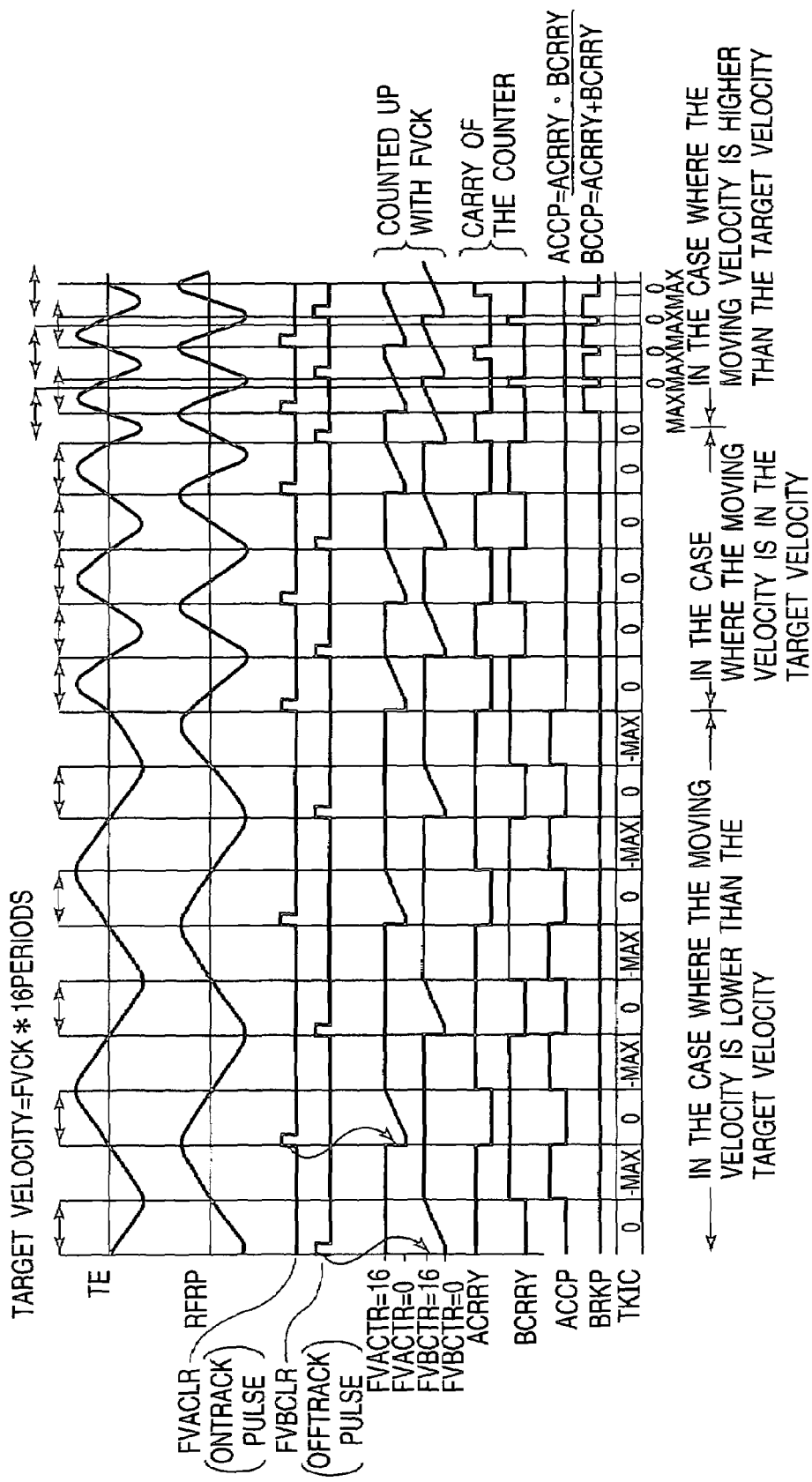
FIG. 8 is a waveform diagram showing the detection result of the velocity error by the velocity error detection circuit and one example of the output timing for the velocity control output.
Figure 11:
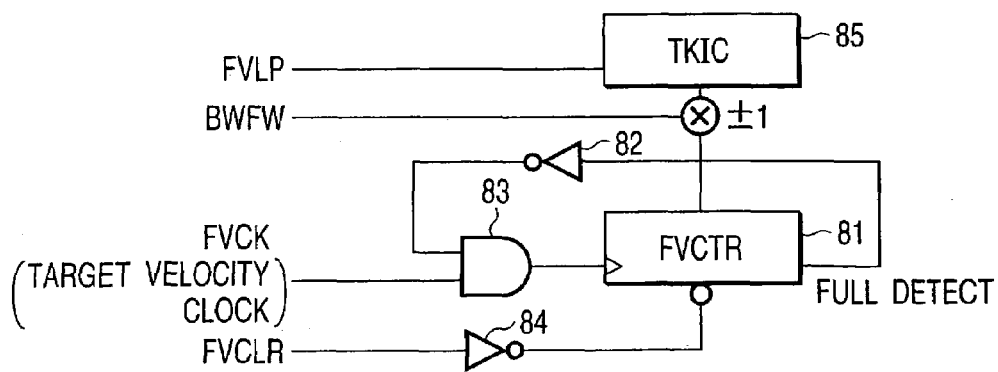
FIG. 11 is a circuit diagram showing a configuration of a conventional velocity error detection circuit of the track search control circuit in the DVD system.
Figure 12:
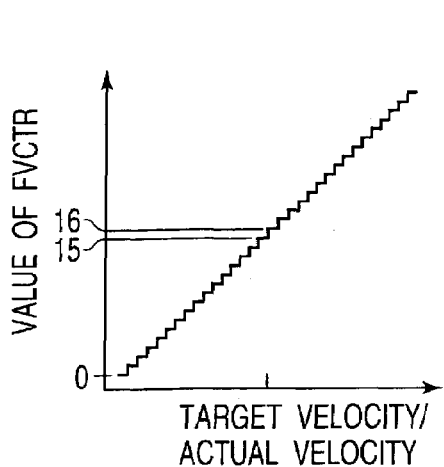
FIG. 12 is a characteristic diagram showing the relation between the velocity error and the velocity error detection signal i.e. the value in FVCTR in the circuit of FIG. 11.
Figure 13:
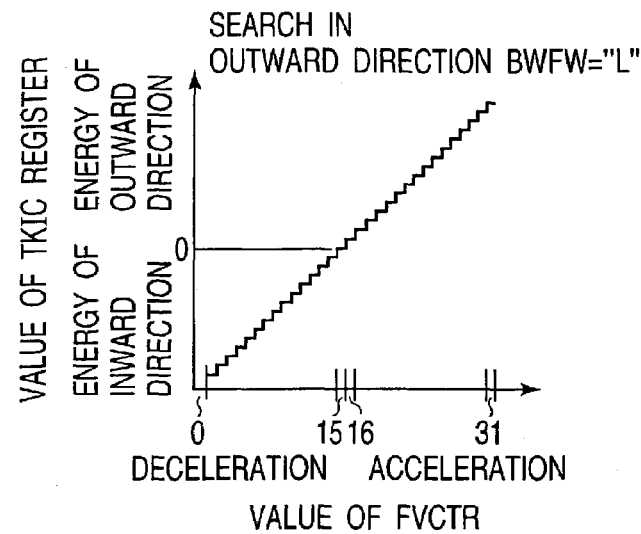
FIG. 13 is a characteristic diagram showing the relation between the velocity error detection signal i.e. the value in FVCTR and the value stored in the TKIC register in the circuit of FIG. 11, in the case of the outward direction search (BWFW="L").
Figure 14:
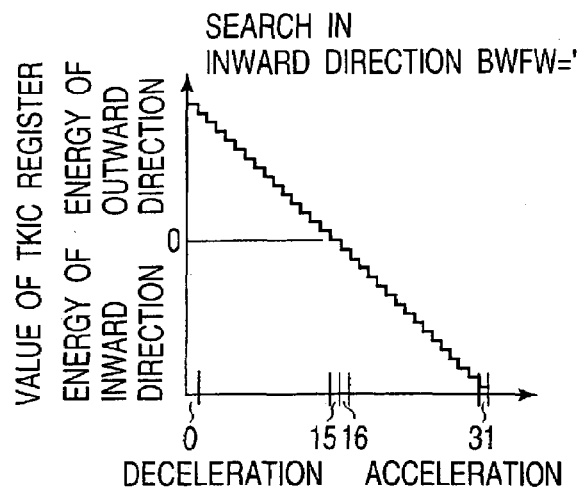
FIG. 14 is a characteristic diagram showing the relation between the velocity error detection signal i.e. the value in FVCTR and the value stored in the TKIC register in the circuit of FIG. 11, in the case of the inward direction search (BWFW="H").
Figure 15:
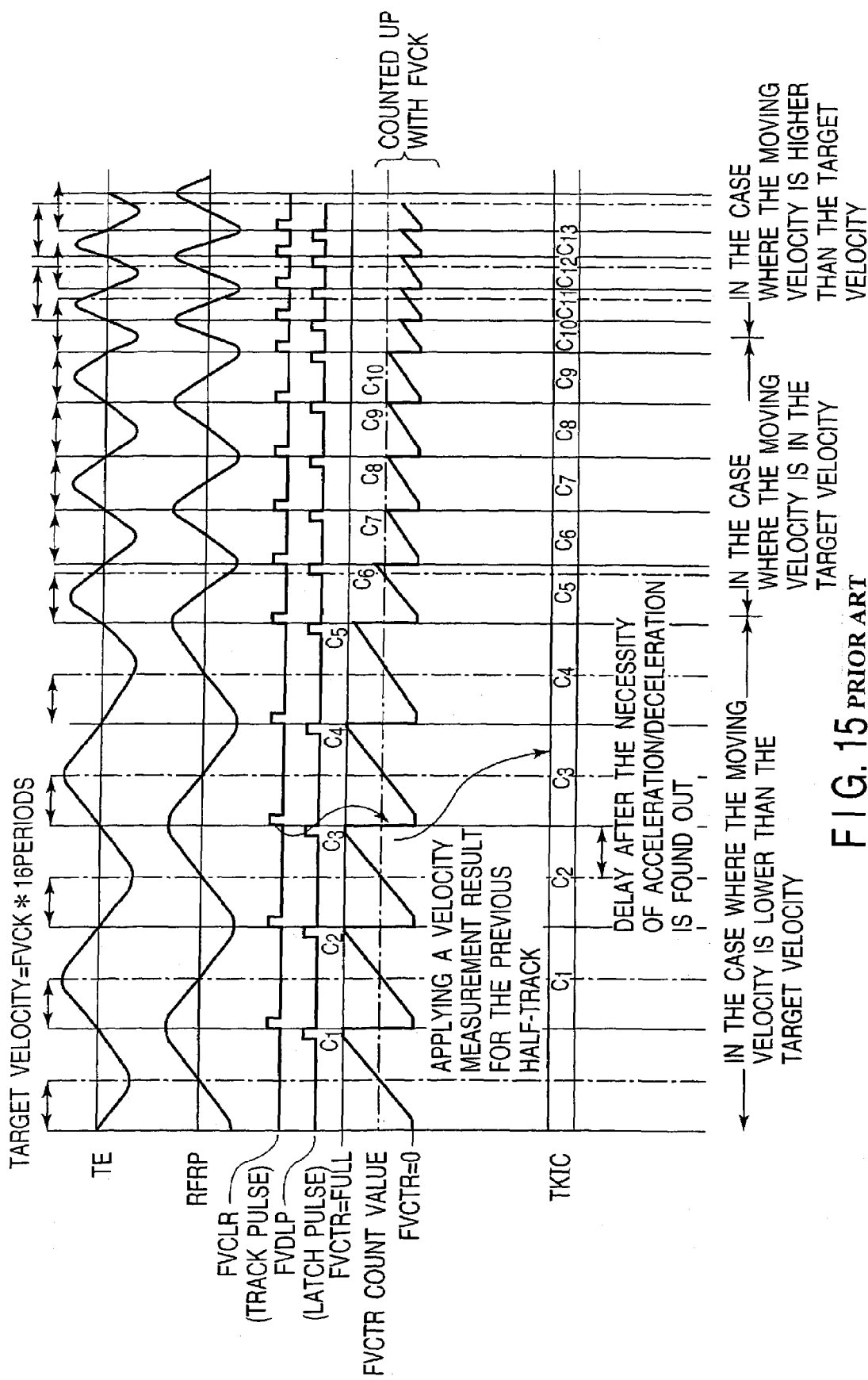
FIG. 15 is a waveform diagram showing the output timing for the detection result of the velocity error by the velocity error detection circuit of FIG. 11.

FIG. 8 is the waveform diagram showing the velocity error detection result by the velocity error detection circuit 27 of FIG. 5 and the output timing for the velocity control output. This is an example in a case where the track search is performed in the outward direction.

FIG. 9 is a characteristic diagram showing the relationship between the velocity error of the velocity error detection circuit 27 of FIG. 5 and an average value of the values stored in the TKIC register in each half-track, in the case of the outward direction search (BWFW="L").

FIG. 10 is a characteristic diagram showing the relationship between the velocity error of the velocity error detection circuit 27 of FIG. 5 and an average value of the values stored in the TKIC register in each half-track, in the case of the inward direction search (BWFW="H").

Hereafter, referring to FIGS. 5 to 10, this embodiment will be described.

FVACTR 51 is a first velocity error detection counter and measures the moving velocity of the light beam after the generation of the normal direction on-track signal, and FVBCTR 52 is a second counter and measures the moving velocity of the light beam after the generation of the normal direction off-track signal.

A signal FVACLR is the on-track pulse signal and clears the counter FVACTR 51 at the time of being on-track, and a signal FVBCLR is the off-track pulse signal and clears the counter FVBCTR 52 at the time of being off-track.

A signal ACRRY becomes "H" level when the relative velocity between the track and the light beam after the generation of the normal direction on-track signal is lower than the target velocity, and a signal BCRRY becomes "H" level when the relative velocity between the track and the light beam after the generation of the normal direction off-track signal is lower than the target velocity.

A signal ACCP is an acceleration pulse and becomes "H" level when the relative velocity between the track and the light beam after the generation of the normal direction on-track signal and the relative velocity between the track and the light beam after the generation of the normal direction off-track signal are both lower than the target velocity, and a signal BRKP is a deceleration pulse and becomes "H" level when the relative velocity between the track and the light beam after the generation of the normal direction on-track signal and the relative velocity between the track and the light beam after the generation of the normal direction off-track signal are both higher than the target velocity.

In the velocity error detection circuit 27 shown in FIG. 5, the first velocity error detection counter (FVACTR) 51 and the second velocity error detection counter (FVBCTR) 52 are time measurement circuits each comprising a 5-bit counter, respectively, and each is counted up by a pulse of the target velocity clock FVCK given by the target velocity clock generation circuit 25 shown in FIG. 2.

The FVACTR 51 is cleared by an inverted signal of the on-track pulse signal FVACLR (a pulse generated at the time of the track search in the on-track period) through an inverter circuit 60, and the FVACTR 51 is cleared by an inverted signal of the off-track pulse signal FVBCLR (a pulse generated at the time of the track search in the off-track period) through an inverter circuit 61. The on-track pulse signal FVACLR and the off-track pulse signal FVBCLR are generated by using the tracking error signal TE, the readout ripple signal RFRP and the track search direction BWFW so as to synchronize with the zero-crossing of the tracking error signal TE in the track pulse generation circuit 22 acting as the track traversing signal generation circuit shown in FIG. 2.

Therefore, the FVACTR 51 is able to count thirty two clocks (FVCKs), and when having counted sixteen clocks, the most significant bit output ACRRY becomes "H" level. In order to hold the counter output throughout a period after this output ACRRY becomes "H" level and until the FVACTR 51 is cleared by the inverted signal of the on-track pulse signal FVACLR, a gate 54 of the target velocity clock FVCK is closed by an inverted signal of the output ACRRY through an inverter circuit 53.

Similarly to the above, the FVBCTR 52 is able to count thirty two clocks (FVCKs) and when having counted sixteen clocks, the most significant bit output BCRRY becomes "H" level. In order to hold the counter output throughout a period after this output BCRRY becomes "H" level and until the FVBCTR 52 is cleared by the off-track pulse signal FVB-CLR, a gate 56 of the target velocity clock FVCK is closed by an inverted signal of the output BCRRY through an inverter circuit 55.

It should be noted that the target velocity clock FVCK is a clock having a frequency sixteen times that of the actual target velocity, and that the FVACTR 51 measures the half-track period after the generation of the normal direction on-track signal with the target velocity clock FVCK and the FVBCTR 52 measures the half-track period after the generation of the normal direction off-track signal with the target velocity clock FVCK.

The time period in which the output ACRRY of the FVACTR 51 is "H" level indicates a state in which it is detected that the moving velocity in the half-track period after the generation of the normal direction on-track signal is lower than the target velocity, and thus the output ACRRY can be used as a flag indicating whether the velocity in the half-track period after the generation of the normal direction on-track signal is higher or lower than the target velocity.

Also, the time period in which the output BCRRY of the FVBCTR 52 is "H" level indicates a state in which it is detected that the moving velocity in the half-track period after the generation of the normal direction off-track signal is lower than the target velocity, and thus the output BCRRY can be use as a flag indicating whether the moving velocity in the half-track period after the generation of the normal direction off-track signal is higher or lower than the target velocity.

Furthermore, the two flags ACRRY and BCRRY are inputted into the AND gate 57, which generates an acceleration flag ACCP when the moving velocities in the half-track period after the generation of the normal direction on-track signal and in the half-track period after the generation of the normal direction off-track signal are both lower than the target velocity. Moreover, the two flags ACRRY and BCRRY are inputted into a NOR gate 58, which generates a deceleration flag BRKP during the time period in which the moving velocities in the half-track period after the generation of the normal direction on-track signal and in the half-track period after the generation of the normal direction off-track signal are both lower than the target velocity. That is, the acceleration flag ACCP and the deceleration flag BRKP each acting as an error signal are generated in the AND gate 57 and the NOR gate 58, respectively, serving as error signal generation circuits.

Furthermore, the acceleration flag ACCP and deceleration flag BRKP are decoded by the decoder 59 and stored in the TKIC register 28 shown in FIG. 2. As shown in FIG. 7, the decoder 59 decodes the acceleration flag ACCP and deceleration flag BRKP in such a way that the maximum acceleration value or the maximum deceleration value is stored in the TKIC register 28 based on the acceleration or the deceleration.

In this embodiment, at a time when the necessity of acceleration/deceleration is found out, the acceleration/deceleration energy is immediately supplied. However, since at this moment of time, it is not yet known how much velocity error the moving velocity has, the decoder 59 outputs any one of the three values, i.e., the maximum acceleration value, the minimum deceleration value, and zero, as shown in FIG. 7.

Therefore, when the velocity error detection circuit 27 applies a signal indicative of an acceleration energy or deceleration energy, the velocity error detection circuit 27 applies the signal of acceleration energy of a constant level or the signal of deceleration energy of a constant level. However, as shown in FIGS. 9 and 10, an average supply value of the energy for each track is linear with respect to the velocity error.

In this way, by a process where the track search circuit outputs the acceleration/deceleration data exactly at a time when the track search velocity is turned out to be lower or higher than the target velocity (i.e., in the acceleration time, within a half-track period when detection of the velocity error is started, and in the deceleration time at the time when the succeeding half-track comes within the target velocity period after detection of the velocity error is started) and immediately apply a signal indicative of the acceleration/deceleration energy into the tracking servo equalizer (represented by the numeral 5 in FIG. 1), the phase delay can be minimized and the track search can be performed stably.

As mentioned in the foregoing, according to the track search control circuit and the optical disc drive equipped with a track search device including the track search control circuit of the present invention, it is possible to promptly reflect the judgment result of the track search velocity on the acceleration/deceleration data even at the multi-speed reproduction time where the relative velocity modulation caused by the eccentricity of the optical disc between the track and the objective lens in the optical pickup becomes large, to thereby stably perform the track search operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A track search control circuit comprising:
an optical pickup for emitting and moving a light beam in the radial direction of an optical disc to write information signal into the optical disc or read the information signal therefrom;
a track traversing signal generation circuit configured to detect, when the light beam emitted from the optical pickup moves in the radial direction of the optical disc, the light beam having traversed a track of the optical disc, and generate a normal direction on-track signal in an on-track period when the light beam traverses a zone of the track in a track search direction defined by a system controller and a normal direction off-track signal in an off-track period when the light beam traverses a zone between the tracks;
a first time measurement circuit configured to start time measurement at a time when the on-track signal is generated by the track traversing signal generation circuit;
a second time measurement circuit configured to start time measurement at a time when the off-track signal is generated by the track traversing signal generation circuit;
a velocity error signal generation circuit configured to detect an error between a relative moving velocity of the light beam of the optical disc to the track and a target velocity based on a measurement outputted by the first time measurement circuit and a measurement outputted by the second time measurement circuit to generate an error signal; and
a correction circuit configured to correct the moving velocity of the light beam in the radial direction based on the error signal generated by the velocity error signal generation circuit.

2. A track search control circuit according to claim 1, wherein the on-track signal and the off-track signal are generated approximately at the time of zero-crossing of a tracking error signal indicating a relative positional displacement in the radial direction of the optical disc between the track and the light beam emitted from the optical pickup.

3. A track search control circuit according to claim 2, wherein the track traversing signal generation circuit detects the light beam having traversed the track of the optical disc based on the tracking error signal and a readout ripple signal.

4. A track search control circuit according to claim 1, wherein the track traversing signal generation circuit detects the light beam having traversed the track of the optical disc based on a tracking error signal indicating a relative positional displacement in the radial direction of the optical disc between the track and the light beam and a readout ripple signal.

5. An optical disc drive comprising:
  an optical pickup for emitting a light beam on a track of an optical disc, on which information is recorded, and receiving the reflected light from the track or the transmitted light therethrough while the optical disc is rotating, thereby extracting the information and converting the information to an electric signal;
  a signal processing circuit configured to generate a tracking error signal that indicates a relative positional displacement in the radial direction of the optical disc between the track and the light beam emitted from the optical pickup and a ripple signal that indicates amplitude information, from the electrical signal output of the optical pickup at a time when the light beam emitted from the optical pickup moves in the radial direction of the optical disc;
  tracking servo mechanism configured to control the light beam emitted from the optical pickup in response to the tracking error signal so that the light beam in the radial direction of the disc is positioned on the track;
  a track traversing signal generation circuit configured to detect that the light beam emitted from the optical pickup has traversed the track based on the tracking error signal and the ripple signal, and generate a normal direction on-track signal in an on-track period when the light beam traverses a zone of the track and a normal direction off-track signal in an off-track period when the light beam traverses a zone between the tracks;
  a first time measurement circuit configured to start time measurement at a time when the on-track signal is generated by the track traversing signal generation circuit;
  a second time measurement circuit configured to start time measurement at a time when the off-track signal is generated by the track traversing signal generation circuit;
  a velocity error signal generation circuit configured to detect an error between a moving velocity of the optical beam in the radial direction of the optical disc and a target velocity based on a measurement output of the first time measurement circuit and a measurement output of the second time measurement circuit to generate an error signal; and
  a tracking velocity correction circuit configured to correct the moving velocity of the optical beam in the radial direction by applying the error signal output of the velocity error signal generation circuit to the tracking servo mechanism.

6. An optical disc drive according to claim 5, wherein the tracking velocity correction circuit starts to apply a signal indicative of an acceleration energy corresponding to the error signal to the tracking servo mechanism in a half-track period after when the velocity error signal generation circuit starts the error detection and a signal indicative of a deceleration energy corresponding to the error signal to the tracking servo mechanism when a succeeding half-track comes in the target velocity period after when the velocity error signal generation circuit starts the error detection.

7. An optical disc drive according to claim 6, wherein the track traversing signal generation circuit, the first time measurement circuit, the second time measurement circuit, the velocity error signal generation circuit, and the tracking velocity correction circuit are formed on the same semiconductor chip in a form of an integrated circuit.

8. An optical disc drive according to claim 5, wherein the track traversing signal generation circuit generates the on-track signal and the off-track signal approximately at the time of zero-crossing of the tracking error signal.

9. An optical disc drive according to claim 8, wherein the track traversing signal generation circuit, the first time measurement circuit, the second time measurement circuit, the velocity error signal generation circuit, and the tracking velocity correction circuit are formed on the same semiconductor chip in a form of an integrated circuit.

10. An optical disc drive according to claim 5, wherein
  the first time measurement circuit comprise a first counter which is cleared by the on-track signal, counts clock signals having a constant frequency higher than that of the on-track signal, and goes into a hold status after generating a first flag output indicating that the moving velocity of the light beam after the generation of the on-track signal is lower than the target velocity;
  the second time measurement circuit comprises a second counter which is cleared by the off-track signal, counts the clock signals, and goes into a hold status after having counted a specified number of clocks and subsequently generating a second flag output indicating that the moving velocity of the light beam after the generation of the off-track signal is lower than the target velocity; and
  the velocity error signal generation circuit, based on the first flag output and the second flag output, generates an acceleration flag when the moving velocity of the light beam after the generation of the on-track signal and the moving velocity of the light beam after the generation of the off-track signal are both lower than the target velocity, and generates a deceleration flag when the moving velocity of the light beam after the generation of the on-track signal and the moving velocity of light beam after the generation of the off-track signal are both higher than the target velocity.

11. An optical signal drive according to claim 10, wherein the tracking velocity correction circuit applies the signal indicative of the acceleration energy or deceleration energy of substantially a constant level to the tracking servo mechanism during both the acceleration flag and the deceleration flag are logically set up.

12. An optical disc drive according to claim 11, wherein the track traversing signal generation circuit, the first time measurement circuit, the second time measurement circuit, the velocity error signal generation circuit, and the tracking velocity correction circuit are formed on the same semiconductor chip in a form of an integrated circuit.

13. An optical disc drive according to claim 10, wherein the track traversing signal generation circuit, the first time measurement circuit, the second time measurement circuit, the velocity error signal generation circuit, and the tracking velocity correction circuit are formed on the same semiconductor chip in a form of an integrated circuit.

14. An optical disc drive according to claim 5, wherein the track traversing signal generation circuit, the first time measurement circuit, the second time measurement circuit, the velocity error signal generation circuit, and the tracking velocity correction circuit are formed on the same semiconductor chip in a form of an integrated circuit.

15. A track search control circuit comprising:

an optical pickup for emitting and moving a light beam in the radial direction of an optical disc to write information signal into the optical disc or read the information signal therefrom;

a signal processing circuit configured to generate a tracking error signal that indicates a relative positional displacement in the radial direction of the optical disc between the track and the light beam emitted from the optical pickup and a ripple signal;

a track traversing signal generation circuit configured to detect, when the light beam emitted from the optical pickup moves in the radial direction of the optical disc to write the information signal into the optical disc or read the information signal therefrom, the light beam having traversed a track of the optical disc based on the tracking error signal indicating a relative positional displacement in the radial direction of the optical disc between the track and the light beam and the ripple signal, and generate a normal direction on-track signal in an on-track period when the light beam traverses a zone of the track in a track search direction defined by a system controller and a normal direction off-track signal in an off-track period when the light beam traverses a zone between the tracks;

a first time measurement circuit configured to start time measurement at a time when the on-track signal is generated by the track traversing signal generation circuit;

a second time measurement circuit configured to start time measurement at a time when the off-track signal is generated by the track traversing signal generation circuit;

a velocity error signal generation circuit configured to detect an error between a relative moving velocity of the light beam of the optical disc to the track and a target velocity based on a measurement outputted by the first time measurement circuit and a measurement outputted by the second time measurement circuit to generate an error signal; and a correction circuit configured to correct the moving velocity of the light beam in the radial direction based on the error signal generated by the velocity error signal generation circuit.

16. A track search control circuit according to claim 15, wherein the on-track signal and the off-track signal are generated approximately at the time of zero-crossing of the tracking error signal.

17. An optical disc drive, comprising:

a signal processing circuit configured to generate a tracking error signal that indicates a relative positional displacement in the radial direction of an optical disc between a track and an optical beam from an optical pickup which emits the optical beam on the track of the optical disc, on which information is recorded, and receive the reflected optical from the track or the transmitted optical therethrough while the optical disc is rotating, thereby extracting the information and converting the information to an electric signal, and a ripple signal that indicates amplitude information, from the electric signal output of the optical pickup at a time when the optical beam emitted from the optical pickup moves in the radial direction of the optical disc;

a tracking servo mechanism configured to control the optical beam emitted from the optical pickup in response to the tracking error signal so that the optical beam in the radial direction of the disc is positioned on the track;

a track traversing signal generation circuit configured to detect that the optical beam emitted from the optical pickup has traversed the track based on the tracking error signal and the ripple signal, and generate an on-track signal in an on-track period when the optical beam traverses a zone of the track and an off-track signal in an off-track period when the optical beam traverses a zone between the tracks;

a first time measurement circuit comprising a first counter which is cleared by the on-track signal, counts clock signals having a constant frequency higher than that of the on-track signal, and goes into a hold status when counting a specified number of clock signals, after generating a first flag output indicating that the moving velocity of the optical beam after the generation of the on-track signal is lower than the target velocity;

a second time measurement circuit comprising a second counter which is cleared by the off-track signal, counts the clock signals, and goes into a hold status when counting a specified number of clock signals, after generating a second flag output indicating that the moving velocity of the optical beam after the generation of the off-track signal is lower than the target velocity; and a velocity error signal generation circuit configured to generate, based on the first flag output and the second flag output, as an error signal, generate an acceleration flag when the moving velocity of the optical beam after the generation of the on-track signal and the moving velocity of the optical beam after the generation of the off-track signal are both lower than the target velocity, and generate a deceleration flag when the moving velocity of the optical beam after the generation of the on-track signal and the moving velocity of the optical beam after the generation of the off-track signal are both higher than the target velocity; and a tracking velocity correction circuit configured to correct the moving velocity of the optical beam in the radial direction by applying the error signal output of the velocity error signal generation circuit to the tracking servo mechanism;

wherein the tracking velocity correction circuit starts to apply a signal indicative of an acceleration energy or a deceleration energy corresponding to the error signal to the tracking servo mechanism in a half-track period after when the velocity error signal generation circuit starts the error detection.

18. An optical disc drive according to claim 17, wherein the on-track signal and the off-track signal are substantially at a constant level.

19. An optical disc drive according to claim 18, wherein the track traversing signal generation circuit, the first time measurement circuit, the second time measurement circuit, the velocity error signal generation circuit, and the tracking velocity correction circuit are formed on the same semiconductor chip in a form of an integrated circuit.

20. An optical disc drive according to claim 17, wherein the track traversing signal generation circuit, the first time measurement circuit, the second time measurement circuit, the velocity error signal generation circuit, and the tracking velocity correction circuit are formed on the same semiconductor chip in a form of an integrated circuit.

21. An optical disc drive, comprising:

a signal processing circuit configured to generate a tracking error signal that indicates a relative positional displacement in the radial direction of an optical disc between a track and an optical beam from an optical pickup which emits the optical beam on the track of the optical disc, on which information is recorded, and receive the reflected optical from the track or the transmitted optical therethrough while the optical disc is rotating, thereby extracting the information and converting the information to an electric signal, and a ripple signal that indicates amplitude information, from the electric signal output of the optical pickup at a time when the optical beam emitted from the optical pickup moves in the radial direction of the optical disc;

a tracking servo mechanism configured to control the optical beam emitted from the optical pickup in response to the tracking error signal so that the optical beam in the radial direction of the disc is positioned on the track;

a track traversing signal generation circuit configured to detect that the optical beam emitted from the optical pickup has traversed the track based on the tracking error signal and the ripple signal, and generate an on-track signal in an on-track period when the optical beam traverses a zone of the track and an off-track signal in an off-track period when the optical beam traverses a zone between the tracks;

a first time measurement circuit comprising a first counter which is cleared by the on-track signal, counts clock signals having a constant frequency higher than that of the on-track signal, and goes into a hold status when counting a specified number of clock signals, after generating a first flag output indicating that the moving velocity of the optical beam after the generation of the on-track signal is lower than the target velocity;

a second time measurement circuit comprising a second counter which is cleared by the off-track signal, counts the clock signals, and goes into a hold status when counting a specified number of clock signals, after generating a second flag output indicating that the moving velocity of the optical beam after the generation of the off-track signal is lower than the target velocity; and a velocity error signal generation circuit configured to generate, based on the first flag output and the second flag output, as an error signal, generate an acceleration flag when the moving velocity of the optical beam after the generation of the on-track signal and the moving velocity of the optical beam after the generation of the off-track signal are both lower than the target velocity, and generate a deceleration flag when the moving velocity of the optical beam after the generation of the on-track signal and the moving velocity of the optical beam after the generation of the off-track signal are both higher than the target velocity; and a tracking velocity correction circuit configured to correct the moving velocity of the optical beam in the radial direction by applying the error signal output of the velocity error signal generation circuit to the tracking servo mechanism, wherein the track traversing signal generation circuit generates the on-track signal and the off-track signal approximately at the time of zero-crossing of the tracking error signal.

22. An optical disc drive according to claim 21, wherein the track traversing signal generation circuit, the first time measurement circuit, the second time measurement circuit, the velocity error signal generation circuit, and the tracking velocity correction circuit are formed on the same semiconductor chip in a form of an integrated circuit.

23. An optical disc drive, comprising:

a signal processing circuit configured to generate a tracking error signal that indicates a relative positional displacement in the radial direction of an optical disc between a track and an optical beam from an optical pickup which emits the optical beam on the track of the optical disc, on which information is recorded, and receive the reflected optical from the track or the transmitted optical therethrough while the optical disc is rotating, thereby extracting the information and converting the information to an electric signal, and a ripple signal that indicates amplitude information, from the electric signal output of the optical pickup at a time when the optical beam emitted from the optical pickup moves in the radial direction of the optical disc;

a tracking servo mechanism configured to control the optical beam emitted from the optical pickup in response to the tracking error signal so that the optical beam in the radial direction of the disc is positioned on the track;

a track traversing signal generation circuit configured to detect that the optical beam emitted from the optical pickup has traversed the track based on the tracking error signal and the ripple signal, and generate an on-track signal in an on-track period when the optical beam traverses a zone of the track and an off-track signal in an off-track period when the optical beam traverses a zone between the tracks;

a first time measurement circuit comprising a first counter which is cleared by the on-track signal, counts clock signals having a constant frequency higher than that of the on-track signal, and goes into a hold status when counting a specified number of clock signals, after generating a first flag output indicating that the moving velocity of the optical beam after the generation of the on-track signal is lower than the target velocity;

a second time measurement circuit comprising a second counter which is cleared by the off-track signal, counts the clock signals, and goes into a hold status when counting a specified number of clock signals, after generating a second flag output indicating that the moving velocity of the optical beam after the generation of the off-track signal is lower than the target velocity; and a velocity error signal generation circuit configured to generate, based on the first flag output and the second flag output, as an error signal, generate an acceleration flag when the moving velocity of the optical beam after the generation of the on-track signal and the moving velocity of the optical beam after the generation of the off-track signal are both lower than the target velocity, and generate a deceleration flag when the moving velocity of the optical beam after the generation of the on-track signal and the moving velocity of the optical beam after the generation of the off-track signal are both higher than the target velocity; and a tracking velocity correction circuit configured to correct the moving velocity of the optical beam in the radial direction by applying the error signal output of the velocity error signal generation circuit to the tracking servo mechanism;

wherein the track traversing signal generation circuit, the first time measurement circuit, the second time measurement circuit, the velocity error signal generation circuit, and the tracking velocity correction circuit are formed on the same semiconductor chip in a form of an integrated circuit.

* * * * *